(12) United States Patent
Nakayama et al.

(10) Patent No.: US 6,226,246 B1
(45) Date of Patent: May 1, 2001

(54) APPARATUS AND METHOD FOR MEASURING CHARACTERISTICS OF OPTICAL PICKUP AND/OR OPTICAL DISC

(75) Inventors: Akihito Nakayama; Kenji Shintani, both of Singapore (SG); Shunsuke Kohama, Chiba (JP); Yukari Hashimoto, Yokohama (JP); Hideo Kato, Kanagawa (JP)

(73) Assignees: Sony Precision Engineering Center (Singapore) Pte, Ltd. (SI); Disk Ware Co. Ltd.; Sony Corporation, both of Tokyo (JP)

( * ) Notice: Subject to any disclaimer, the term of this patent is extended or adjusted under 35 U.S.C. 154(b) by 0 days.

(21) Appl. No.: 09/182,179

(22) Filed: Oct. 29, 1998

(30) Foreign Application Priority Data

Oct. 31, 1997 (SG) ..................................... 9703918

(51) Int. Cl.[7] .................................................. G11B 3/90
(52) U.S. Cl. ...................................... 369/53.14; 369/44.32
(58) Field of Search ............................. 369/44.11, 44.13, 369/44.25, 44.27, 44.28, 44.29, 44.32, 44.34, 44.35, 53.14, 53.12, 53.13, 53.23, 53.42

(56) References Cited

U.S. PATENT DOCUMENTS 5,933,397 * 8/1999 Yamashita et al. ........... 369/44.29 X
6,118,739 * 9/2000 Kishinami et al. ........... 369/44.32 X

* cited by examiner

Primary Examiner—Paul W. Huber
(74) Attorney, Agent, or Firm—Frommer Lawrence & Haug, LLP.; William S. Frommer

(57) ABSTRACT

A device for measuring characteristics of an optical pickup and/or an optical disc by which characteristics of tracking signals can be measured accurately in a noise-free manner. The measurement device 1 has a sample-and-hold circuit 8 and an analog-to-digital converter 10 for directly sampling an output of an optical pickup 2 as signals A to F in order to store the resulting digital data in a second memory 11. An arithmetic-logic unit 12d measures tracking error signals based on the digital data stored in the second memory 11. The arithmetic-logic unit 12d eliminates unstable portions of the tracking signals generated responsive to rotational eccentricity of the optical disc to find data.

8 Claims, 7 Drawing Sheets

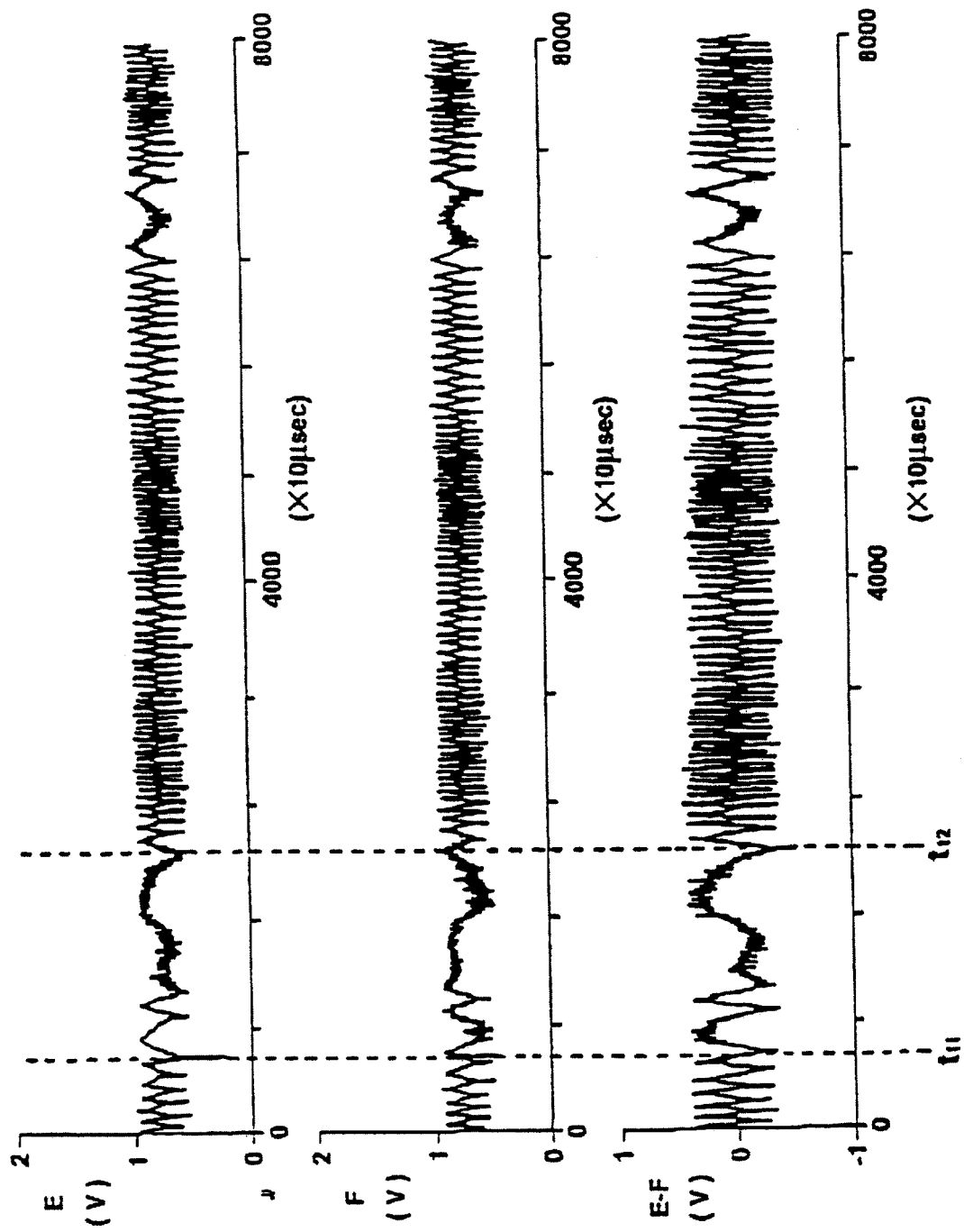

APPARATUS AND METHOD FOR MEASURING CHARACTERISTICS OF OPTICAL PICKUP AND/OR OPTICAL DISC

FIELD OF THE INVENTION

This invention relates to an apparatus and a method for measuring characteristics of an optical pickup and/or an optical disc.

DESCRIPTION OF THE RELATED ART

There has so far been known a device for inspecting characteristics of an optical pickup used in an optical disc drive. The device for inspecting characteristics of an optical pickup is used for example in inspection for shipment or reception of an optical pickup in connection with whether or not the optical pickup satisfies the prescribed specifications.

FIG. 1 shows a block diagram of a conventional device 100 for inspecting characteristics of an optical pickup.

The conventional device 100 for inspecting characteristics of an optical pickup shown in FIG. 1 is designed to inspect an optical pickup.

The conventional device 100 for inspecting characteristics of an optical pickup includes a test bench 102 on which the optical disc is set, a matrix circuit 103 supplied with an output of a photodetector of the optical pickup 101 for outputting a playback signal (RF signal) and a servo control circuit 104 for performing servo control for reproducing an optical disc based on an output of the matrix circuit 103.

The conventional device 100 for inspecting characteristics of an optical pickup also includes n measurement circuits 105a to 105n for measuring various characteristic values of the optical pickup based on an output of the matrix circuit 103, a multiplexer 106 for switching between outputs of the measurement circuits 105a to 105n and a multiplexer 106 for switching between outputs of the measurement circuits 105a to 105n. The conventional device 100 for inspecting characteristics of an optical pickup further includes an analog-to-digital converter 107 for converting an output of one of the circuits 105a to 105n selected by the multiplexer 106 into digital data and a computer 108 for statistically processing output data of the analog-to-digital converter 107 for displaying the results.

The optical pickup 101 is a subject of inspection by this device 100 for inspecting characteristics of an optical pickup. The optical pickup 101 is detachably mounted on this device 100 for inspecting characteristics of an optical pickup. The optical pickup 101 includes a laser diode, a beam splitter, an objective lens and a photodetector. This optical pickup 101 condenses a laser light beam outgoing from a laser diode via beam splitter and an objective lens on the optical disc. The optical pickup also forms an image of the reflected light from the optical disc on the photodetector. The photodetector provided on the optical pickup 101 is a photoelectric converting device and converts the imaged reflected light into electrical signals.

The optical pickup 101 usually includes plural photodetectors. For example, the optical pickup 101 includes a four-segment photodetectors and a pair of photodetectors arranged on both sides of the four-segment photodetectors for side spot detection. Outputs of these photodetectors are routed to the matrix circuit 103.

The test bench 102, on which is set the optical disc, runs this optical disc in rotation for reproducing the disc. The optical disc set on the test bench 102 is used as reference for this device 100 for inspecting characteristics of the optical pickup.

The matrix circuit 103 is fed with outputs of the photodetectors of the optical pickup 101 to generate playback (RF) signals, focusing error (FE) signals and tracking error (TE) signals from the photodetector outputs.

If the photodetector provided on the optical pickup 101 is made up of four-segment photodetectors and both side photodetectors for detecting side spots, the matrix circuit 103 outputs the following signals: That is, the matrix circuit 103 finds the sum of the respective outputs of the four-segment detectors to output the result as RF signal. The matrix circuit 103 also outputs FE signal by the astigmatic method. Specifically, the matrix circuit 103 computes the sums of the two photodetectors lying across the four-segment detectors to find the difference between the sums to output the resulting difference as the FE signal. The matrix circuit 103 also computes the difference between the side spot detecting photodetectors to output the resulting difference as TE signal.

The matrix circuit 103 routes the RF, FE and TE signals, thus computed, to the servo control circuit 104 and the measurement circuits 105a to 105n.

The servo control circuit 104 performs servo control during reproduction of the optical disc based on the RF, FE and TE signals. Specifically, the servo control circuit 104 performs focusing servo control, tracking servo control, thread servo control and tilt servo control.

The measurement circuits 105a to 105n calculate characteristic values of the optical pickup 101. The measurement circuits 105a to 105n measure respective different characteristic values. Therefore, the number of the measurement circuits 105a to 105n corresponds to that of the characteristic values to be measured.

The measurement circuits 105a to 105n perform filtering, peak detection or frequency/voltage conversion by analog processing in order to compute the characteristic values. The first measurement circuit 105a measures the signal level of an S-shaped curve at the time of capturing a focusing servo loop based on, for example, the FE signals. The second measurement circuit 105b measures the level of the TE signals based on the TE signals. The third measurement circuit 105c measures the level of the RF signal based on the RF signal. The fourth measurement circuit 105d measures jitter components of the RF signal based on the RF signal.

The multiplexer 106 switches between outputs of the measurement circuits 105a to 105n to route an output of the selected measurement circuit to the analog-to-digital converter 107.

The analog-to-digital converter 107 converts outputs of the measurement circuits 105a to 105n supplied via multiplexer 106 into digital data which is routed to the computer 108. The rate of conversion of the analog-to-digital converter 107 is low because the outputs of the measurement circuits 105a to 105n are substantially at the dc level. For example, the rate of conversion of the analog-to-digital converter 107 is on the order of 1 KHz.

The computer 108 performs statistic processing of digital data supplied from the analog-to-digital converter 107 to display the results.

In the conventional device 100 for inspecting characteristics of an optical pickup, as described above, the characteristic values of the optical pickup 101 are measured by, for example, n measurement circuits 105a to 105n, with the number n corresponding to the number of the characteristic values to be measured. The measured results are displayed for the user on the computer 108.

The method for measuring the level of the TE signal by this conventional device 100 for inspecting characteristics of the optical pickup is explained in detail.

This device 100 for inspecting characteristics of the optical pickup measures the level of the TE signal using eccentricity of rotation of the optical disc.

Such eccentricity of rotation of the optical disc occurs when the center of the optical disc set on the test bench 102 for rotational driving is offset from the axis of rotation.

For example, if eccentricity of rotation is caused in optical disc rotation, the optical disc is set on the test bench 102 so that the center O of the optical disc D differs from the axis of rotation of the optical disc D, as shown in FIG. 2.

Therefore, the separation x between a position of irradiation Lx on the optical disc D of the laser light beam L radiated from the optical pickup and the center O of the optical disc D is varied with the rotational position of the optical disc D.

Specifically, if the center O of the optical disc D is furthest from the point of illumination Lx of the laser light beam L, this distance x becomes a distance x1 corresponding to the distance between the axis of rotation and the point of illumination of the laser light beam Lx plus the distance between the axis of rotation and the center O of the optical disc D. If the optical disc D is rotated by ¼ from the rotational position shown in FIG. 2A, the distance x becomes equal to the distance x2, as shown in FIG. 2A, if the optical disc D is rotated by ¼ from the rotational position shown in FIG. 2B, the center O of the optical disc D becomes closest to the point of illumination of the laser light beam Lx, with the distance x becoming equal to a distance x3 corresponding to the distance between the axis of rotation and the center O of the optical disc D minus the distance between the axis of rotation and the center O of the optical disc D, as shown in FIG. 2C. If the optical disc D is rotated by ¼ from the rotational position shown in FIG. 2C, the distance x becomes equal to x4 as shown in FIG. 2D.

Therefore, if the rotation of the optical disc D undergoes eccentricity, the point of illumination Lx on the optical disc D of the laser light beam L illuminated on the optical disc D is varied in synchronism with the rotational period of the optical disc D. Specifically, the point of illumination Lx on the optical disc D of the laser light beam L illuminated on the optical disc D is moved back and forth through the distances x3 to x1 from the center O of the optical disc D, as shown in FIG. 3. Thus, the point of illumination Lx traverses plural recording tracks due to eccentricity of rotation of the optical disc D.

For measuring the TE signal level by the conventional device 100 for inspecting characteristics of an optical pickup, focusing servo control is performed on the optical disc subjected to eccentricity of rotation as described above. With this device 100 for inspecting characteristics of an optical pickup, the radial position of the optical pickup with respect to the optical disc is fixed, with the tracking servo circuit being turned off. With the device 100 for inspecting characteristics of an optical pickup, the optical disc is run in rotation, with the focusing servo on and with the tracking servo off, for detecting the TE signal produced with the rotational eccentricity using, for example, the measurement circuit 105b.

With the device 100 for inspecting characteristics of an optical pickup, the TE signal detected by the measurement circuit 105b is integrated for averaging the TE signal level for measuring the resulting averaged signal level. The value measured by the measurement circuit 105b is taken into the computer 108 for display for the user.

With the device 100 for inspecting characteristics of an optical pickup, the TE signal level can be measured using rotational eccentricity of the optical disc, as described above.

Meanwhile, if the TE signal is detected using rotational eccentricity of the optical disc, the period of the TE signal is varied responsive to the track traversing velocity of the laser light illuminated from the optical pickup 10. In particular, at the turning points of the reciprocal movement of the illuminated position of the laser light beam, the traversing velocity becomes zero, so that the TE signal period becomes extremely unstable. Specifically, the turning points of the reciprocal movement mean a point at which the illuminated position of the laser light beam on the optical disc becomes furthest from the center of the optical disc (FIG. 2A) and a point at which the illuminated position of the laser light beam on the optical disc becomes closest to the center of the disc (FIG. 2C).

With the conventional device 100 for inspecting characteristics of an optical pickup, if the illuminated position of the laser light beam on the optical disc has turning points, there is produced in the TE signal a waveform shown at time t1 to t2 of FIG. 4. In the conventional device 100 for inspecting characteristics of an optical pickup, this signal portion becomes noise components when measuring the TE signal, thus disabling correct measurement.

SUMMARY OF THE INVENTION

According to the present invention, there is provided an apparatus for measuring characteristics of an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

rotational driving means for rotating the optical disc in an eccentric state; and characteristics detection means for detecting a signal for generating tracking error signals from an output of the photoelectric converting device of the optical pickup, detecting the vicinity of a transition point of an illuminated position of the laser light beam caused by eccentricity, removing signal portions of the vicinity of the transition point from the signal for generating tracking error signals and for measuring the characteristic values of the optical pickup and/or the optical disc based on the above signal freed of the signal of the vicinity of a transition point.

The characteristics detection means may detect the periods between peak values of waveforms of the tracking signals from the peak values for detecting signal portions exceeding the pre-set values of the periods as the vicinity of the transition point.

The apparatus may further comprise:

analog-to-digital converter means for converting an output of the photoelectric converting unit of the optical pickup into digital data, and memory means for storing digital data converted by the analog-to-digital converter; wherein the characteristics detection means measures characteristic values of the optical pickup and/or the optical disc based on the digital data stored by the memory means.

The rotational driving means may rotate an optical disc in an eccentric state.

According to another aspect of the present invention, there is provided a method for measuring characteristics of an optical pickup and/or an optical disc comprising:

rotating the optical disc in an eccentric state;

detecting a signal for generating tracking error signals from an output of a photoelectric converting unit of the optical pickup;

removing signal portions of the vicinity of a transition point in the movement direction of an illuminated point by the laser light beam caused by eccentricity; and measuring the characteristic values of the optical pickup and/or the optical disc based on the signal freed of signal portions in the vicinity of the transition point.

The period between peak values of respective waveforms of the tracking signals may be detected from peak values and detecting signal portions the period of which exceeds a pre-set value as the vicinity of the transition point.

The method for measuring characteristics of an optical pickup or an optical disc may further comprise:

converting an output of the photoelectric converting unit of the optical pickup into digital data;

storing the converted digital data; and measuring characteristic values of the optical pickup and/or the optical disc based on the stored digital data.

The method for measuring characteristics of an optical pickup or an optical disc may further comprise rotating the optical disc in an eccentric state.

BRIEF DESCRIPTION OF THE DRAWINGS

In order that the invention might be more fully understood, embodiments of the invention will be described, by way of example only, with reference to the accompanying drawings:

FIGS. 7A, 7B and 7C illustrate measured results by the device for inspecting characteristics of an optical pickup shown in FIG. 5.

DESCRIPTION OF EMBODIMENTS

Figure 1:
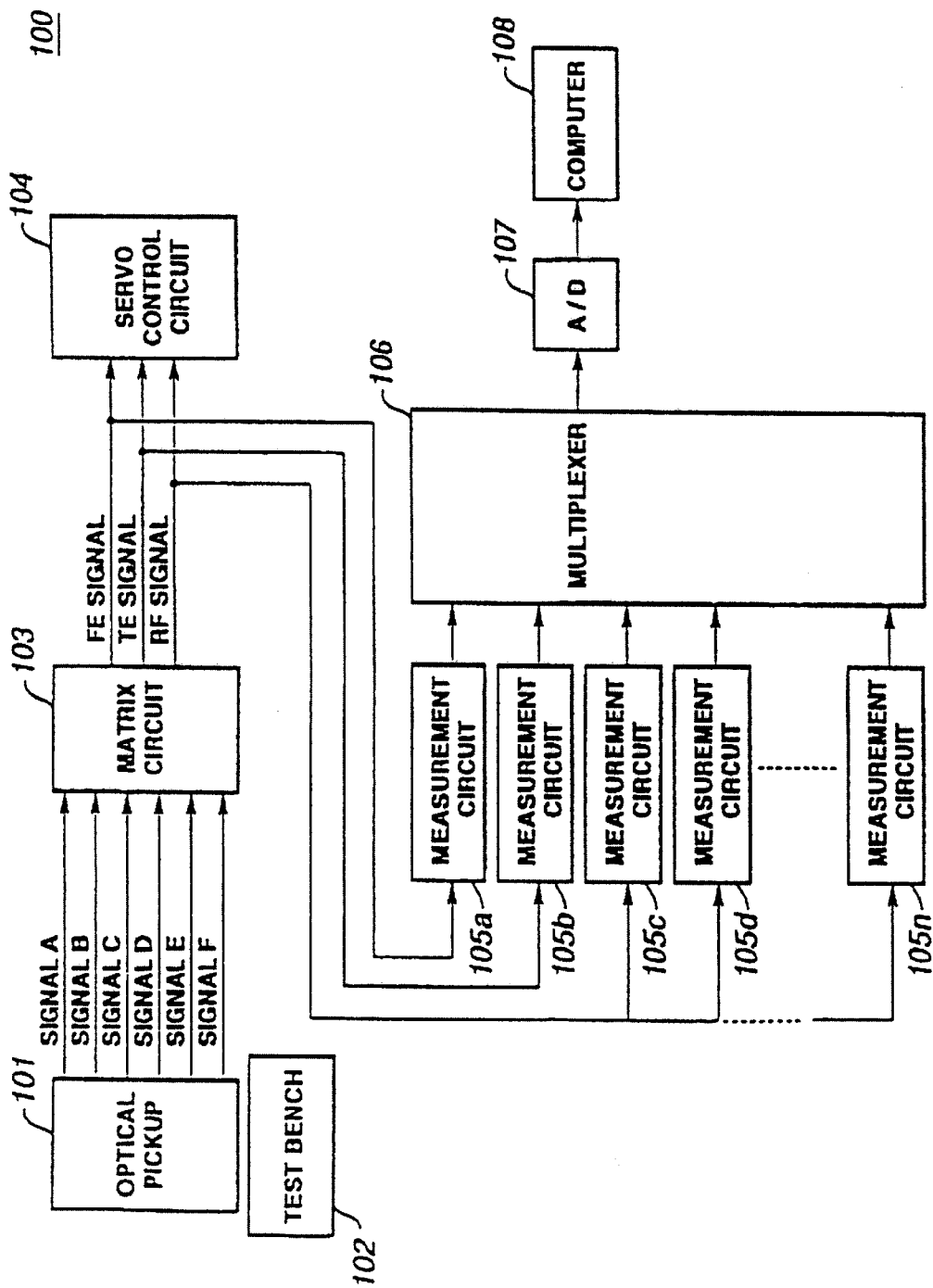
FIG. 1 is a block diagram of a known device for measuring characteristics of a conventional optical pickup.
Figure 2A:
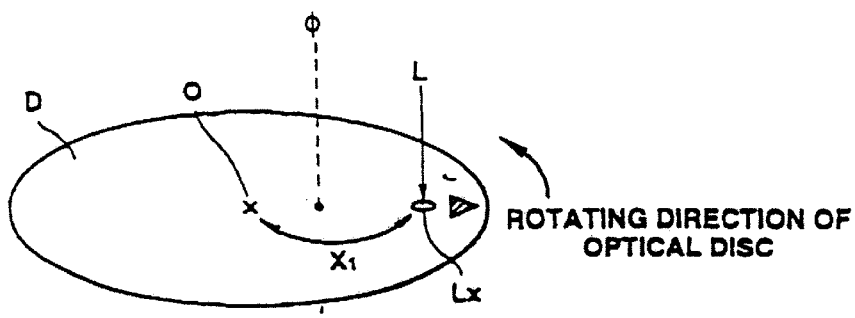
FIGS. 2A, 2B, 2C and 2D illustrate rotational eccentricity of a known optical disc.
Figure 2B:
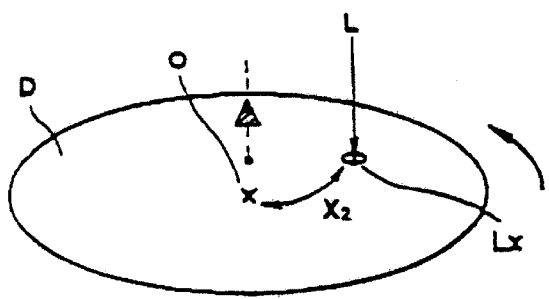
Figure 2C:
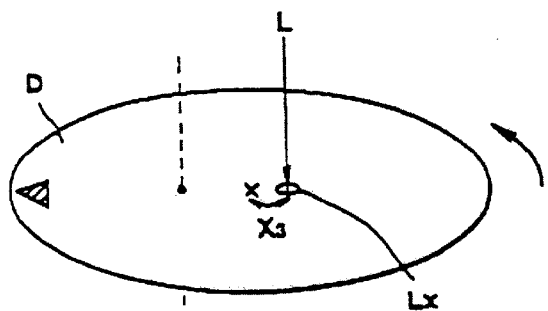
Figure 2D:
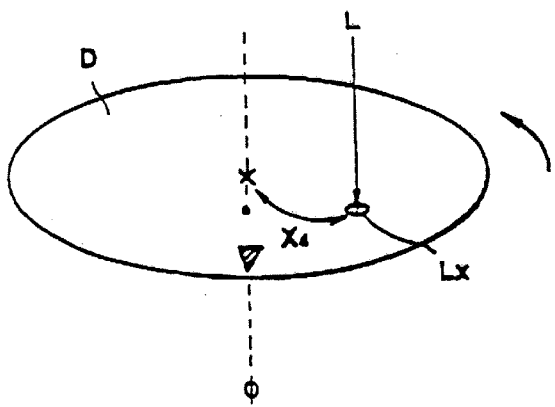

Referring to the drawings, a preferred embodiment of the present invention will be explained in detail.

The device for inspecting characteristics of an optical pickup embodying the present invention, referred to hereinafter as a device for inspecting characteristics or characteristics inspecting device, inspects characteristics of an optical pickup used in an optical disc drive. This sort of the characteristics inspecting device is used for inspecting specifications or characteristics of the optical pickup in, for example, shipment or acceptance tests of the optical pickup.

Figure 5:
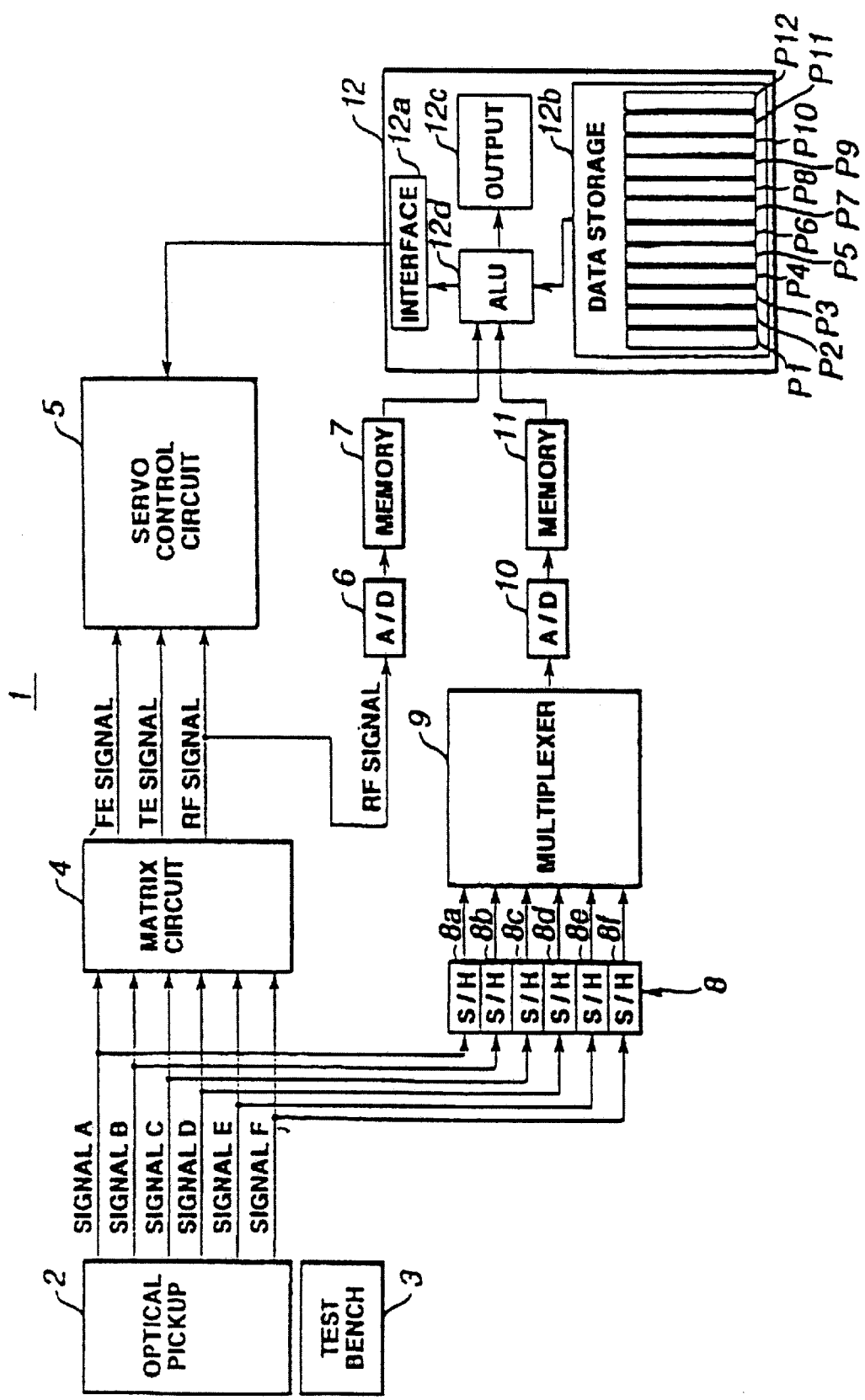
FIG. 5 is a block diagram of a device for inspecting characteristics of an optical pickup embodying the present invention.

FIG. 5 shows a block diagram of a device for inspecting characteristics 1 embodying the present invention.

The device for inspecting characteristics 1 is used for inspecting characteristics of an optical pickup 2.

The device for inspecting characteristics 1 includes a test bench 3 on which to set an optical disc, a matrix circuit 4 fed with an output of a photodetector of the optical pickup 2 for outputting a playback (RF) signal and a servo control circuit 5 for performing servo control for reproducing an optical disc based on an output of the matrix circuit 4.

The device for inspecting characteristics 1 also includes a first analog-to-digital converter 6 for converting RF signals of the matrix circuit 4 to digital signals and a first memory 7 for transiently storing output data of the first analog-to-digital converter 6.

The device for inspecting characteristics 1 further includes first to sixth sample-and-hold circuits 8a to 8f for sample-holding outputs of the photodetectors of the optical pickup 2, a multiplexer 9 for switching outputs of the first to sixth sample-and-hold circuits 8a to 8f, a second analog-to-digital converter 10 for converting the outputs of the first to sixth sample-and-hold circuits 8a to 8f into digital data and a second memory 11 for transiently storing output data of the second analog-to-digital converter 10.

The device for inspecting characteristics 1 additionally includes a computer 12 for computing characteristic values of the optical pickup 2 based on the digital data transiently stored in the first memory 7 and in the second memory 11 for displaying the computed results and for controlling the servo control circuit 5 based on the computed results.

The optical pickup 2 is the subject of inspection by this device for inspecting characteristics 1. The optical pickup 2 is detachably mounted on this device for inspecting characteristics 1. The optical pickup 2 includes a laser diode, a beam splitter, an objective lens and a photodetector. This optical pickup 2 condenses a laser light beam outgoing from a laser diode via beam splitter and an objective lens on the optical disc. The optical pickup also forms an image of the reflected light from the optical disc on the photodetector. The photodetector provided on the optical pickup 101 is a photoelectric converting device and converts the imaged reflected light into electrical signals.

Figure 6:
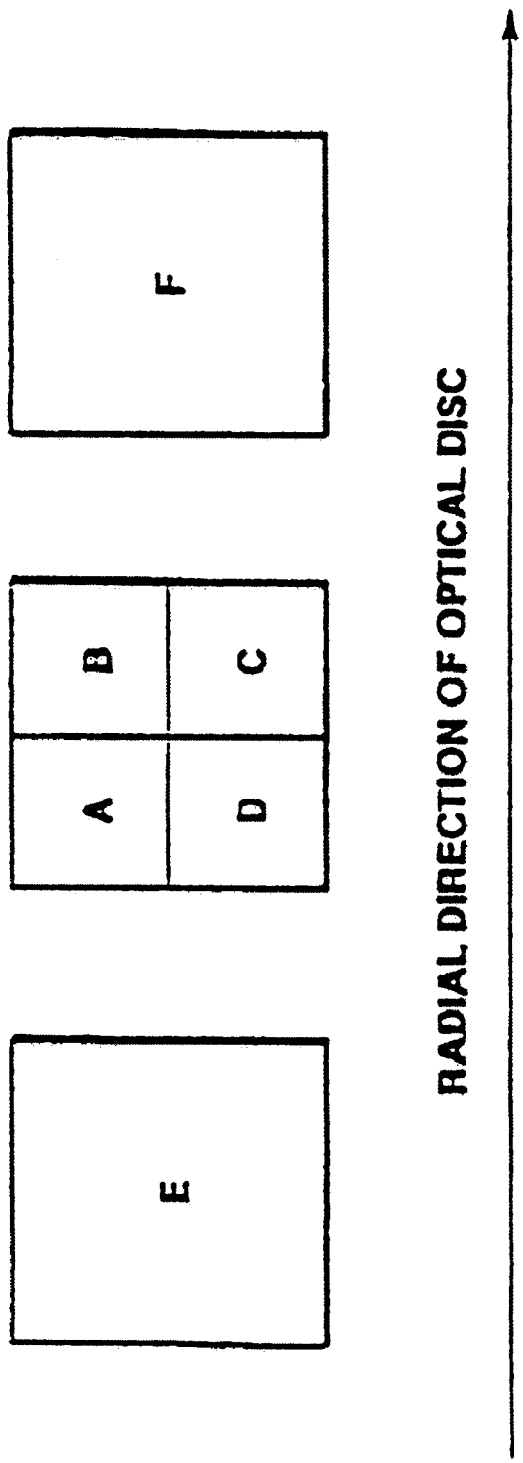
FIG. 6 illustrates a photodetector provided on an optical pickup inspected by the device for inspecting characteristics of an optical pickup shown in FIG. 5.

The optical pickup 2 includes plural photodetectors. FIG. 6 shows an example of plural photodetectors provided on the optical pickup 6.

The optical pickup 2 includes four photodetectors A to D, arrayed in a 2 2 matrix configuration, and photodetectors E and F arrayed on both sides of the photodetectors A to D for side spot detection, as shown for example n FIG. 6. These photodetectors A to F are used in, for example, in a so-called three-spot optical pickup adapted for radiating three laser light beams to the optical disc. The photodetectors A to D are irradiated with a main beam as a center beam in the three-spot system. That is, the photodetectors A to D are irradiated with reflected light from recording pits recorded on the recording track of the optical disc. The photodetectors E and F are arranged on both sides of the photodetectors A to D in the radial direction of the optical disc. The photodetectors E and F are irradiated with side beams of the three-spot system. For example, the photodetectors E and F are irradiated with light reflected from, for example, the edges of the optical disc track.

The photodetectors A to F convert the light volume of the illuminated reflected light into signals A to F. The optical pickup 2 routes these signals A to F to the matrix circuit 4. The optical pickup 2 sends the signals A to F to the first to sixth sample-and-hold circuits 8a to 8f, respectively.

The test bench 3, on which is set the optical disc, runs the optical disc in rotation for reproducing the disc. The optical disc, set on this test bench 3, is used as a reference for this characteristics inspection device 1. That is, the characteristics inspection device 1 measures characteristics of the optical pickup 2 based on the playback signals of the optical disc used as the reference.

The matrix circuit 4 is fed with signals A to F outputted by the photodetectors A to F of the optical pickup 2 for generating playback (RF) signals, focusing error (FE) signals and tracking error (TE) signals based on these signals A to F. The matrix circuit 4 generates these RF, FE and TE signals based n the signals A to F as follows: That is, the matrix circuit 4 computes A+B+C+D based on the signals A to D to generate RF signals. On the other hand, the matrix circuit 4 outputs FE signals by the astigmatic method. Specifically, the matrix circuit 4 computes (A+C)−(B+D) based on the signals A to D to output the computed results as FE signals. On the other hand, the matrix circuit 4 computes E−F based on the signals E and F and sends the computed results as TE signals.

The matrix circuit 4 sends the computed RF, FE and TE signals to the servo control circuit 5. Also, the matrix circuit 4 sends the RF signals to the first analog-to-digital converter 6.

The servo control circuit 5 performs servo control for reproducing the optical disc based on the RF, FE and TE signals. Specifically, the servo control circuit 5 drives a biaxial actuator actuating the objective lens of the optical pickup 2, based on the FE signals, so that the FE signals will be zero, for performing focusing servo control. Also, the servo control circuit 5 drives the biaxial actuator actuating the objective lens of the optical pickup 2, based on the TE signals, so that the TE signals will be zero, for performing tracking servo control. The servo control circuit 5 detects dc components of the FE signals to perform thread servo control of the optical pickup 2 so that this dc component will be zero. The servo control circuit 5 also performs tilt servo control for controlling the tilt of the optical disc based on the RF signals. Meanwhile, this servo control circuit 5 may be provided with a separate disc tilt detection unit for performing the tilt servo control.

The first analog-to-digital converter 6 converts the RF signals supplied from the matrix circuit 4 into digital data at a high sampling frequency, such as at a sampling frequency of, for example, 30 MHz. The first analog-to-digital converter 6 sends the RF signals converted into digital data to the first memory 7.

The first memory 7 transiently stores the RF signals converted into digital data by the first analog-to-digital converter 6.

The sample-and-hold circuits 8a to 8f are fed from the optical pickup 2 with the signals A to F as photodetector output signals. The sample-and-hold circuits 8a to 8f sample-hold the signals A to F simultaneously using the same clocks. The clocks supplied to these sample-and-hold circuits 8a to 8f are at frequencies not lower than, for example, 50 kHz. Thus, the sample-and-hold circuits 8a to 8f repeat the sampling and holding operations with the clock of not less than 50 kHz as one cycle.

The multiplexer 9 switch between outputs of the sample-and-hold circuits 8a to 8f for supplying one of the sample-held outputs to the second analog-to-digital converter 10. This multiplexer 9 operates at a rate not less than six times as high as 50 kHz, if the sample-and-hold circuits 8a to 8f perform sample-holding operations with the clocks of 50 kHz, so that the sample-held outputs of the sample-and-hold circuits 8a to 8f can be supplied within one clock to the second analog-to-digital converter 10.

The second analog-to-digital converter 10 converts all sample-held outputs of the sample-and-hold circuits 8a to 8f supplied thereto via multiplexer 9 into digital data which is supplied to the second memory 11. This second analog-to-digital converter 10 has a conversion rate sufficient to convert outputs of the sample-and-hold circuits 8a to 8f within one cycle of the clocks supplied to the sample-and-hold circuits 8a to 8f. Since there are six sample-and-hold circuits 8a to 8f, the second analog-to-digital converter 10 achieves the conversion at a conversion rate not less than 300 kHz if the sample-and-hold circuits 8a to 8f repeat the sample-hold operations by 50 kHz clocks.

The sample-and-hold circuits 8a to 8f, multiplexer 9 and the second analog-to-digital converter 10 convert the signals A to F outputted by the photodetectors of the optical pickup 2 independently into digital data. Moreover, the sample-and-hold circuits 8a to 8f, multiplexer 9 and the second analog-to-digital converter 10 convert the signals A to F into digital data at the sampling frequency of, for example, not less than 50 kHz.

In the characteristics inspection device 1, the signals A to F as photodetector output signals of the optical pickup 2 can be converted into digital data by means other than the above-described sample-and-hold circuits 8a to 8f, multiplexer 9 and the second analog-to-digital converter 10. For example, the characteristics inspection device 1 may be comprised of six parallel rows of the analog-to-digital converters each having the sampling frequency of 50 kHz.

The second memory 11 transiently stores the signals A to F of the optical pickup 2 converted into digital data by the second analog-to-digital converter 10.

The computer 12 includes, for example, an interfacing section 12a, a data storage section 12b, an output section 12c and an arithmetic-logic unit 12d. The interfacing section 12a outputs a control signal controlling the servo control circuit to this servo control circuit 5. The data storage section 12b has stored therein processing programs corresponding to measurement items of the optical pickup 2 by the characteristics inspection device 1. The output section 12c displays measured results of the characteristics of the optical pickup 2.

The arithmetic-logic unit 12 of the computer 12 reads out the RF signals converted into the digital data from the first memory 7 for detecting jitter components of the RF signals based on the read-out data.

The arithmetic-logic unit 12d of the computer 12 also reads out the signals A to F, converted into digital data, from the second memory 11, and executes arithmetic-logic operations on the measurement items for measuring the characteristics of the optical pickup 2.

In carrying out the processing for the respective measurement items, the arithmetic-logic unit 12d of the computer 12 performs the following arithmeticlogic operations on the data stored in the first memory 7 and the second memory 11. For example, the arithmetic-logic unit 12d performs filtering, peak level calculations, calculations of the waveform period, calculations of the phase difference of two signals, signal extraction by a level window, signal extraction by a periodic window and calculations of the ac and dc signal components.

The items of measurement by the characteristics inspection device 1 are hereinafter explained.

The present characteristics inspection device 1 measures the following items for searching the characteristics of the optical pickup 2:

RF signal level (P1)

$I_{TOP}$ and $I_{BOTTOM}$ of the RF signal (P2)

Jitter of RF signal (P3)

Beam position of the main beam (P4)

TE signal level (P5)
E-F balance (P6)
E-F phase difference (P7)
S-letter level (P8)
S-letter balance (P9)
Defocusing (P10)
Cross-talk (P11)
Astigmatic Aberration (P12)

The processing program for these items of measurement are stored in the data storage section 12b as processing programs P1 to P12. The arithmetic-logic unit 12d reads out from the data storage unit 12b the processing programs P1 to P12 associated with the measurement items for performing arithmetic-logic operations on the data stored in the first memory 7 or the second memory 11. In the processing programs P1 to P12, measurement of the above items is carried out using the filtering, peak level calculations, calculations of the waveform period, calculations of the phase difference of two signals, signal extraction by a level window, signal extraction by a periodic window and calculations of the ac and dc signal components as described above.

The processing for measuring the above-mentioned TE signal level and the E-F phase difference is hereinafter explained.

In measuring the TE signal level and the E-F phase difference, the characteristics inspection device 1 performs the processing using the rotational eccentricity of the optical disc.

As explained with reference to FIGS. 5 and 6, the rotational eccentricity of the optical disc is induced if the center of the optical disc set on the test bench 3, for example, is not coincident with the axis of disc rotation. Moreover, even if the axis of rotation is coincident with the optical disc center, the rotational eccentricity of the optical disc is induced if the optical disc is not set at right angle to the axis of rotation but is set with an inclination relative to the axis of disc rotation. In addition, the rotational eccentricity of the optical disc is induced due to, for example, warping caused to the disc. That is, the rotational eccentricity of the optical disc is induced if the circumference defined by the track is deviated from the center of the optical disc.

In measuring the TE signal level and the E-F phase difference, the servo control circuit 5 turns on the focusing servo to effect focusing servo control, while turning off tracking servo so as not to effect tracking servo control. That is, with the present characteristics inspection device, the laser light beam is illuminated with the optical pickup 2 fixed in its position.

The arithmetic-logic unit 12d reads out digital data corresponding to the signals E and F from the second memory 11. Then, data corresponding to the signals E and F and the TE signal corresponding to the signal E minus signal F are computed and displayed for the user by the output unit 12c. FIG. 7 shows an example of measured data displayed by the output unit 12c. Specifically, FIGS. 7A, 7B and 7C show the signal E, signal F and the signal TE corresponding to (E-F).

The arithmetic-logic unit 12d detects peak values of the signal E, signal F and the signal TE read out from the second memory 11. The arithmetic-logic unit 12d then measures the interval between the peak values to find the periods of the respective waveforms. The arithmetic-logic unit 12d then compares the periods thus found with pre-set thresholds to detect signals having the waveforms exceeding pre-set periods. The arithmetic-logic unit 12d then finds data of the signals E, F and TE freed of data of signal portions the periods of which exceed pre-set threshold values.

Figure 3:
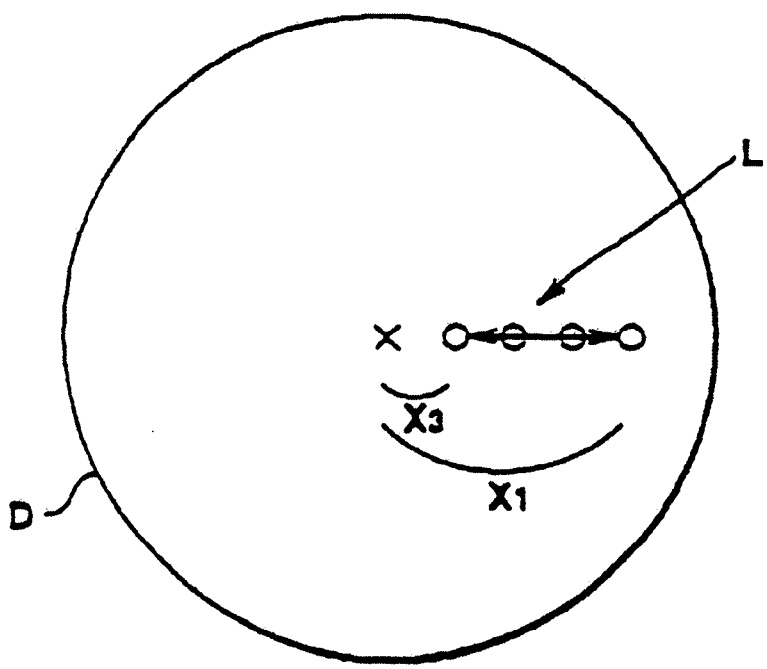
FIG. 3 illustrates illuminated points of the laser light on a known optical disc moved back and forth due to rotational eccentricity of an optical disc.
Figure 4:
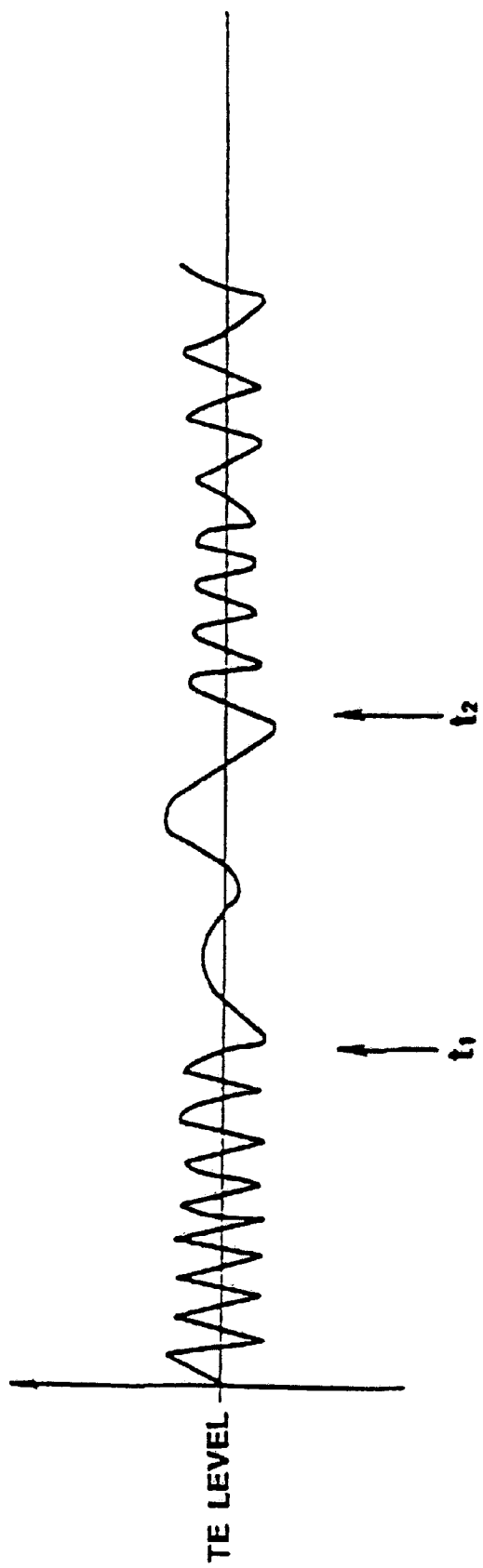
FIG. 4 illustrates tracking error signals detected using rotational eccentricity of a known optical disc.

The arithmetic-logic unit 12d thus removes the portions of the signals E, F and TE the periods of which exceed the pre-set thresholds to derive signals freed of unstable signal portions caused by reciprocation of the illuminated portions on the optical disc of the laser light beam caused by eccentricity. Specifically, the waveform signals the periods of which exceed pre-set periods are those signals in the vicinity of the turning points of the reciprocating movements of the illuminated positions of the laser light beam caused by eccentricity of rotation represented by signals from time t11 until time t12 in FIG. 3.

Based on the data freed of the signal portions the periods of which exceed pre-set periods, the arithmetic-logic unit 12d finds the E-F phase difference between the signals E and F while detecting an average value of the TE signal to find the TE signal level.

With the characteristics inspection device 1, as described above, the test bench 3 causes the optical disc to be rotated in an eccentric state and signal portions of the detected signals E, F and TE the periods of which exceed pre-set periods are removed to measure the E-F phase difference and the TE signal level. Thus it is possible with the characteristics inspection device 1 to produce the E, F and TE signals freed of unstable signal portions produced at the turning points of reciprocating movements of the illuminated positions of the laser light beam on the optical disc thus enabling measurement of the accurate E-F phase difference and TE signals freed of noise.

Moreover, in the characteristics inspection device 1, the signals A to F as outputs signals of the photodetectors of the optical pickup 2 are directly converted into digital data for measuring characteristics of the optical pickup 2. Thus, stable measurement can be realized by the characteristics inspection device 1 without being affected by fluctuations in initial characteristics of, for example, the servo control circuit 5 or by changes with lapse of time. In addition, since data of the turning points are removed after conversion to digital data, there is no necessity of providing filters complicated in structure. On the contrary, noise-free accurate E-F phase difference and TE signal level can be easily measured if only it is determined whether or not the peak-to-peak periods of, for example, the TE signal, exceeds a pre-set threshold value.

Although the foregoing description has been made on the characteristics inspection device 1 adapted for measuring the characteristics of the optical pickup 2, this device 1 can also be adapted for inspecting the characteristics of an optical disc. That is, while an optical disc set on the test bench 3 is used as a reference, it is also possible to measure characteristics of an optical disc by employing an optical pickup as a reference.

Although the optical pickup 2 measured by the characteristics inspection device 1 measures the signals A to F using the photodetectors shown in FIG. 6, the present invention is not limited to the use of such optical pickup. For example, the present invention is applicable to an optical pickup for a magneto-optical disc or an optical pickup for a phase transition disc. In these cases, the photodetector differs in structure from the photodetectors explained with reference to FIG. 2, so that the numbers of the sample-and-hold circuits 8a to 8f or the second analog-to-digital conveters 10 correspond to the number of the photodetectors. On the other hand, if the disc is a magneto-optical disc, the playback signal is a difference signal exploiting the Kerr effect. Therefore, the processing contents of the program in the arithmetic-logic unit 12d is matched to this difference signal.

In summary, in embodiments of the characteristics measuring device for the optical pickup and/or the optical disc, the optical disc is rotated in an eccentric state, and the signal portions in the vicinity of the transition point of the movement direction of the illuminated position of the laser light beam moved by this eccentricity are removed for measuring characteristic values of the signal for generating the tracking error signals.

In embodiments of the method for measuring the characteristics of the optical pickup and/or the optical disc, the optical disc is rotated in an eccentric state, and the signal portions in the vicinity of the transition point of the movement direction of the laser light beam moved by the eccentricity are removed for measuring the characteristic values of the signal for generating the tracking error signals.

With the characteristics measuring device according to embodiments of the present invention, the optical disc is rotated in the eccentric state, and the signal portions in the vicinity of the transition point of the movement direction of the illuminated position of the laser light beam moved by this eccentricity are removed for measuring the characteristic values of the signal used for generating tracking error signals.

This enables characteristic values of the tracking error signals to be measured accurately in an error-free manner with the optical pickup and/or the optical disc.

With the characteristics measuring method according to embodiments of the present invention, the optical disc is rotated in the eccentric state, and the signal portions in the vicinity of the transition point of the movement direction of the illuminated position of the laser light beam moved by this eccentricity are removed for measuring the characteristic values of the signal used for generating tracking error signals.

This again enables characteristic values of the tracking error signals to be measured accurately in an error-free manner with the optical pickup and/or the optical disc.

The embodiments have been advanced by way of example only and modifications are possible within the spirit and scope of the appended claims.

What is claimed is:

1. An apparatus for measuring characteristics of an optical pickup and/or an optical disc comprising:

focusing servo control means for controlling a focal point position of a laser light beam illuminated on the optical disc, based on an output of a photoelectric converting unit of the optical pickup, for focusing the laser light beam on a recording surface of the optical disc;

rotational driving means for rotating the optical disc in an eccentric state; and characteristics detection means for detecting a signal for generating tracking error signals from an output of the photoelectric converting device of the optical pickup, detecting the vicinity of a transition point of an illuminated position of the laser light beam caused by eccentricity, removing signal portions of the vicinity of the transition point from the signal for generating tracking error signals and for measuring the characteristic values of the optical pickup and/or the optical disc based on the above signal freed of the signal of the vicinity of a transition point.

2. The apparatus for measuring characteristics of an optical pickup and/or an optical disc as claimed in claim 1 wherein said characteristics detection means detects the periods between peak values of waveforms of the tracking signals from said peak values for detecting signal portions exceeding the pre-set values of the periods as the vicinity of the transition point.

3. The apparatus for measuring characteristics of an optical pickup and/or an optical disc as claimed in claim 1 further comprising:

analog-to-digital converter means for converting an output of the photoelectric converting unit of the optical pickup into digital data, and memory means for storing digital data converted by said analog-to-digital converter; wherein said characteristics detection means measures characteristic values of the optical pickup and/or the optical disc based on the digital data stored by said memory means.

4. The apparatus for measuring characteristics of an optical pickup and/or an optical disc as claimed in claim 1 wherein said rotational driving means rotates an optical disc in an eccentric state.

5. A method for measuring characteristics of an optical pickup and/or an optical disc comprising:

rotating the optical disc in an eccentric state;

detecting a signal for generating tracking error signals from an output of a photoelectric converting unit of the optical pickup;

removing signal portions of the vicinity of a transition point in the movement direction of an illuminated point by the laser light beam caused by eccentricity; and measuring the characteristic values of the optical pickup and/or the optical disc based on said signal freed of signal portions in the vicinity of the transition point.

6. The method for measuring characteristics of an optical pickup or an optical disc as claimed in claim 5 wherein the period between peak values of respective waveforms of the tracking signals is detected from peak values and detecting signal portions the period of which exceeds a pre-set value as the vicinity of the transition point.

7. The method for measuring characteristics of an optical pickup or an optical disc as claimed in claim 5 further comprising:

converting an output of the photoelectric converting unit of the optical pickup into digital data;

storing the converted digital data; and measuring characteristic values of the optical pickup and/or the optical disc based on the stored digital data.

8. The method for measuring characteristics of an optical pickup or an optical disc as claimed in claim 5 further comprising:

rotating the optical disc in an eccentric state.

* * * * *